United States Patent
Bonvin et al.

(10) Patent No.: US 8,754,602 B2
(45) Date of Patent: Jun. 17, 2014

(54) MOTOR CONTROLLER WITH DRIVE-SIGNAL CONDITIONING

(75) Inventors: Frederic Bonvin, Longmont, CO (US); Ezio Galbiati, Agnadello (IT)

(73) Assignees: STMicroelectronics, Inc., Coppell, TX (US); STMicroelectronics S.r.l., Agrate Brianza (IT)

( * ) Notice: Subject to any disclaimer, the term of this patent is extended or adjusted under 35 U.S.C. 154(b) by 431 days.

(21) Appl. No.: 12/552,989

(22) Filed: Sep. 2, 2009

(65) Prior Publication Data

US 2010/0052585 A1    Mar. 4, 2010

Related U.S. Application Data

(60) Provisional application No. 61/093,671, filed on Sep. 2, 2008.

(51) Int. Cl.
*H02P 6/10* (2006.01)

(52) U.S. Cl.
USPC ............. 318/400.23; 318/400.24; 318/448; 318/629

(58) Field of Classification Search
USPC ........... 318/400.23, 400.24, 400.34, 448, 629
See application file for complete search history.

(56) References Cited

U.S. PATENT DOCUMENTS

| | | | |
|---|---|---|---|
| 2,476,787 A | 7/1949 | Wellings | |
| 3,569,848 A | 3/1971 | Esteban | |
| 3,649,912 A | 3/1972 | Nakamura | |
| 3,947,736 A * | 3/1976 | Byers | 318/811 |
| 3,967,173 A * | 6/1976 | Stich | 318/811 |
| 4,047,083 A * | 9/1977 | Plunkett | 318/807 |
| 4,123,692 A * | 10/1978 | Gilmore et al. | 363/41 |
| 4,668,898 A | 5/1987 | Hamms | |
| 4,764,711 A | 8/1988 | Deller | |
| 4,804,894 A * | 2/1989 | Machida et al. | 388/812 |
| 5,028,852 A | 7/1991 | Dunfield | |
| 5,051,680 A | 9/1991 | Belanger | |
| 5,327,064 A | 7/1994 | Arakawa | |
| 5,374,857 A | 12/1994 | Carobolante | |
| 5,656,897 A | 8/1997 | Carobolante et al. | |
| 5,691,613 A | 11/1997 | Gutwillinger | |
| 5,798,624 A | 8/1998 | Wilke et al. | |
| 6,137,253 A | 10/2000 | Galbiati | |
| 6,768,623 B1 | 7/2004 | Shen | |
| 6,777,907 B2 * | 8/2004 | Ho | 318/801 |
| 7,026,774 B2 | 4/2006 | Inaba et al. | |
| 7,042,186 B2 * | 5/2006 | Stancu et al. | 318/609 |
| 7,176,644 B2 | 2/2007 | Ueda et al. | |
| 7,262,568 B2 | 8/2007 | Takada | |
| 7,482,777 B2 | 1/2009 | Tomigashi | |

* cited by examiner

*Primary Examiner* — Bentsu Ro
(74) *Attorney, Agent, or Firm* — Graybeal Jackson LLP

(57) ABSTRACT

An embodiment of a motor controller includes a motor driver and a signal conditioner. The motor driver is configured to generate a motor-coil drive signal having a first component at a first frequency, and the signal conditioner is coupled to the motor driver and is configured to alter the first component. For example, if the first component of the motor-coil drive signal causes the motor to audibly vibrate (e.g., "whine"), then the signal conditioner may alter the amplitude or phase of the first component to reduce the vibration noise to below a threshold level.

22 Claims, 6 Drawing Sheets

MOTOR CONTROLLER WITH DRIVE-SIGNAL CONDITIONING

CLAIM OF PRIORITY

This application claims priority to U.S. Provisional Application Ser. No. 61/093,671, entitled METHODS AND APPARATUSES FOR REDUCING PURE TONE ACOUSTIC NOISE GENERATION AND FOR SENSING ROTOR POSITION IN BLDC MOTORS, filed Sep. 2, 2008, which is incorporated herein by reference in its entirety.

CROSS REFERENCE TO RELATED APPLICATION

This application is related to U.S. patent application Ser. No. 12/552,963, entitled DETERMINING A POSITION OF A MOTOR USING AN ON-CHIP COMPONENT, filed on Sep. 2, 2009, which application is incorporated herein by reference in its entirety.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

An embodiment of a motor controller includes a motor driver and a signal conditioner. The motor driver is configured to generate a motor-coil drive signal having a first component at a first frequency, and the signal conditioner is coupled to the motor driver and is configured to alter the first component.

For example, if the first component of the motor-coil drive signal causes the motor to audibly vibrate (e.g., "whine"), then the signal conditioner may alter the amplitude or phase of the first component to reduce the magnitude (i.e., volume) of the whine to below a threshold level.

DETAILED DESCRIPTION

A motor controller may be designed to drive a motor with a substantially constant rotational velocity, i.e., a substantially constant torque. For example, a disk-drive motor controller may be designed to drive a spindle motor, and thus the data-storage disk(s) attached to the motor, with a substantially constant torque to reduce the rotational jitter (also called torque ripple) of the disk(s). Reducing the disk's jitter may reduce the complexity of a disk drive's data-read channel, which may track the disk jitter to reduce or eliminate data-read errors.

One technique for driving a brushless-DC-type motor with a substantially constant torque is to drive each of the motor coils with a sinusoidal current that is (1) phase shifted relative to the other coil currents by substantially 360°/N, where N is the number of motor coils, i.e., motor phases, and (2) substantially in phase with the sinusoidal back electromotive force (BEMF) generated by the respective coil. For example, one might drive each coil of a three-phase motor with a respective sinusoidal current that is shifted by ±120° relative to the other coil drive currents and that is in phase with the sinusoidal BEMF of the coil.

Although one may drive a motor coil with a sinusoidal current by applying a sinusoidal analog voltage across the coil, this may be relatively inefficient in terms of the power consumption of the motor controller.

Therefore, a constant-torque motor controller may drive a motor coil with a substantially sinusoidal current by applying a pulse-width-modulated (PWM) voltage across the coil. Driving a motor coil with a PWM voltage signal may be more energy efficient because the drive transistors may operate as switches such that they operate mainly in their on and off regions instead of in their linear regions.

Although a PWM voltage may induce a substantially sinusoidal current in a motor coil, this current may not be a pure sinusoid, i.e., a pure tone, and thus may include signal components at the harmonics of the fundamental frequency of the coil current—the fundamental frequency of the coil current is the same as the fundamental frequency of the PWM voltage signal.

Furthermore, even if one applies a respective sinusoidal analog voltage across each of the coils such that the coil currents are substantially sinusoidal, one or more of the BEMF voltages across the coils may not be pure sinusoids, and thus may include signal components at the harmonics of the fundamental frequency of the coil currents and BEMF voltages.

Unfortunately, one or more of these harmonic components (i.e., harmonics) may cause the motor to audibly vibrate, and, thus, to annoy a user of equipment that includes the motor. For example, as discussed below, one or more of these harmonics may excite a vibratory mode of the motor.

Figure 1:
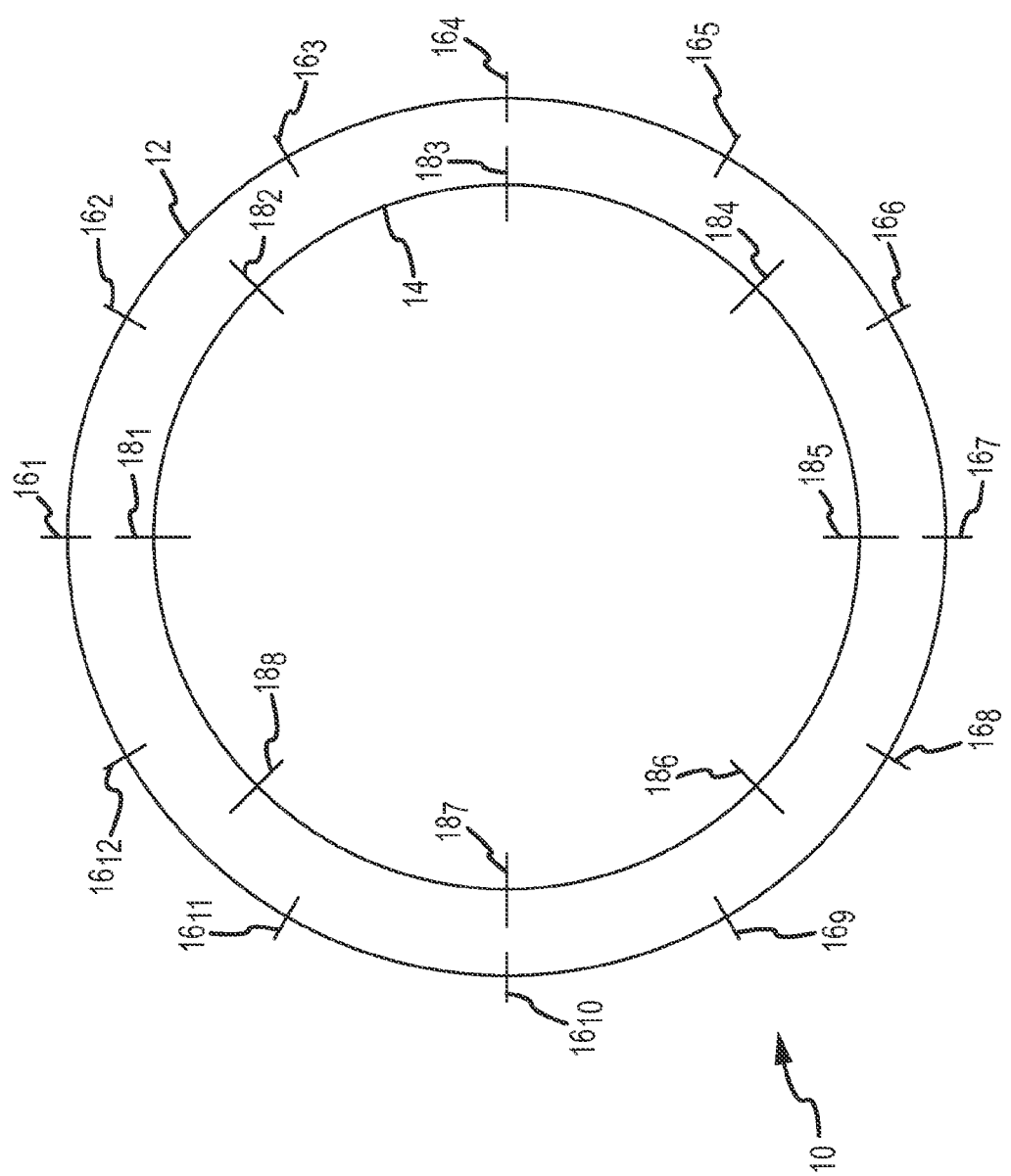
FIG. 1 is a diagram of the rotor and stator of an embodiment of a motor.

FIG. 1 is a diagram of an embodiment of a brushless DC motor 10, which includes a stator 12 and a rotor 14. The stator 12 includes a number of slots 16 (twelve slots $16_1$-$16_{12}$ in this embodiment), and the rotor 14, which rotates within the stator, includes a number of poles 18 (eight poles $18_1$-$18_8$ in this embodiment). Each slot 16 may be modelled as an inductive winding that presents a magnetic north pole toward the rotor 14 while current flows through the winding in a first direction, and that presents a magnetic south pole toward the rotor while current flows through the winding in a second, opposite direction. And each pole 18 is a respective magnet that presents either a magnetic north pole or a magnetic south pole toward the stator 12. Ideally, the slots 16 are evenly spaced around the stator 12, and the poles 18 are evenly spaced around the rotor 14.

In FIG. 1, the rotor 14 is shown in an asymptotically stable position, where the poles $18_1$, $18_3$, $18_5$, and $18_7$ are respectively aligned with the slots $16_1$, $16_4$, $16_7$, and $16_{10}$, and the poles $18_2$, $18_4$, $18_6$, and $18_8$ are each halfway between the respective slot pairs $16_2$-$16_3$, $16_5$-$16_6$, $16_8$-$16_9$, and $16_{11}$-$16_{12}$. Because the slots 16 are metallic windings, the pole magnets $18_1$, $18_3$, $18_5$, and $18_7$ are respectively attracted to the slots $16_1$, $16_4$, $16_7$, and $16_{10}$; and, because they are halfway between respective slot pairs, the poles $18_2$, $18_4$, $18_6$, and $18_8$ have zero net force applied to them.

As the rotor 14 rotates through one full turn, it rotates through twenty four different asymptotically stable positions. In general, the number of asymptotically stable positions of a magnetic-pole motor is given by the following equation:

$$\text{\#Positions} = S \cdot P / LCD_{PS} \tag{1}$$

where S is the number of slots 16, P is the number of poles 18, and $LCD_{PS}$ is the lowest common denominator of S and P. Therefore, in the disclosed embodiment of the motor 10, #Positions=(12·8)/4=24 as stated above.

One who turns the rotor 14 by hand may be able to feel the perturbations as the rotor 14 is pulled into and then forced out of these asymptotically stable positions. These perturbations are caused by the attractive forces that tend to pull the rotor 14 into one of these stable positions and to resist the rotor being turned out of its current stable position. And the frequency of these perturbations is equal to the product of the number of stable positions and the frequency at which the motor 10 is rotating. For example, if the motor 10 is rotating at 7200 rotations per minute (RPM), then the perturbation frequency is 2880 Hz.

The forces that give rise to these perturbations may be referred to collectively as the cogging torque of the motor, or the cogging of the motor. And the frequency of these perturbations may be referred to as the cogging frequency of the motor.

As discussed below, it is theorized that in some motor applications, one or more of the harmonics of the coil currents or of the coil BEMF voltages excite the motor at the motor's cogging frequency, and thus cause the motor to vibrate at a frequency within the range of human hearing and at a level that may be perceived by the human ear.

Still referring to FIG. 1, for a three-phase motor, such as the motor 10 that is driven with a purely sinusoidal current and that generates purely sinusoidal BEMF voltages, the portion $T_1$ of the total mutual motor torque $T_M$ attributed to a first one of the three coils is given by the following equation:

$$T_1 = U_1 I_1 \cos^2(\omega t) \tag{2}$$

where $U_1$ is the amplitude of the sinusoidal BEMF voltage of the coil, $I_1$ is the amplitude of the sinusoidal current flowing through the coil, and $\omega$ is the radial frequency of both the BEMF and the current. Also, for a four-pair-poles motor, $\omega$ is four times the frequency at which the rotor 14 rotates.

The portions $T_2$ and $T_3$ of $T_M$ respectively attributed to the second and third motor coils have the same magnitude as $T_1$ and respective phases of +120° (+2π/3) and −120° (−2π/3) relative to the phase of $T_1$.

Therefore, the mutual torque $T_M$ for a three-phase motor driven by purely sinusoidal coil currents and generating purely sinusoidal BEMF voltages is a constant that is given by the following equation:

$$T_M = +T_1 + T_2 + T_3 = 3/2 UI \tag{3}$$

where $U=U_1=U_2=U_3$ and $I=I_1=I_2=I_3$.

But as discussed above, when the motor coils are driven by PWM voltage signals or generate BEMF voltages that are not pure sinusoids, the coil currents, the BEMF voltages, or both the coil currents and the BEMF voltages may include harmonics of the fundamental frequency $\omega$ of the coil currents and BEMF voltages.

It can be shown that for a motor having three phases, the even harmonics $2\omega$, $4\omega$, $6\omega$, ..., $2n\omega$ (n is an arbitrary integer) of the coil currents and BEMF voltages effectively cancel each other, and, therefore, have little or no affect on the motor torque—an explanation of why this is so is omitted for brevity.

Furthermore, it can be shown that for a three-phase motor, the harmonics $N\omega$, $2N\omega$, $3N\omega$, ..., $nN\omega$ of the differential voltages applied between the coils (by both the coil drive signals and BEMF voltages) effectively cancel each other, and, therefore, have little or no affect on the motor torque—an explanation of why this is so is omitted for brevity. For example, for a three-phase motor, all coil-current and BEMF harmonics that are multiples of three (e.g., the third, sixth, ninth, twelfth, fifteenth, and eighteenth harmonics) have little or no affect on the motor torque.

But it can be shown that for a three-phase motor, all of the odd harmonics of the coil currents and BEMF voltages that are not integer multiples of three may have a non-negligible affect on the mutual torque $T_M$ as described below.

For example, in a three-phase motor such as the motor 10 of FIG. 1, e.g., the fifth, seventh, eleventh, thirteenth, seventeenth, and nineteenth harmonics may have a non-negligible affect on the mutual torque $T_M$. Harmonics greater than the nineteenth harmonic are omitted from this analysis because the energies at these harmonics are typically low enough to render the effects of these harmonics negligible, because these harmonics are typically outside of the range of human hearing, and because the frequency response of the motor coils is typically low enough to filter out the affects of these harmonics.

Unfortunately, these non-cancelling odd harmonics may cause torque ripple at the following frequencies: $6\omega$, $12\omega$, and $18\omega$. Although the torque ripple resulting from the non-cancelling harmonics may seem counterintuitive given the statement above that the even and 3n harmonics of the coil currents and BEMF voltages cancel, it is theorized to be accurate as described below.

As discussed above, the portion T of the mutual torque $T_M$ attributed to a single motor coil is:

$$T = UI \cos^2(\omega t) = U \cos(\omega t) \cdot I \cos(\omega t) \tag{4}$$

That is, the current I through a motor coil effectively modulates the BEMF voltage U across the coil, and vice-versa. But to reduce the complexity of the explanation, it is assumed for the following analysis that the BEMF voltages are pure sinusoids, and that only the coil currents include harmonic components. The analysis, however, may be similar if the coil currents are pure sinusoids and the BEMF voltages include harmonic components, or if both the coil currents and the BEMF voltages include harmonic components.

Consequently, when a non-cancelling harmonic $n\omega$ of the coil current I modulates the BEMF U (which has frequency $\omega$) across the coil, a torque-ripple component may result at frequencies equal to the sum and difference of the non-cancelling harmonic $n\omega$ and the fundamental frequency w. That is, a torque-ripple component may result at $(n−1) \cdot \omega$ and $(n+1) \cdot \omega$.

Therefore, the harmonic of the coil current at $5\omega$ may generate a torque-component ripple at $(5−1=4)\omega$ and $(5+1=6)\omega$, the harmonic of the coil current at $7\omega$ may generate a torque-ripple component at $(7−1=6)\omega$ and $(7+1=8)\omega$, etc. But for reasons that are omitted for brevity, in a three-phase motor, the sums of the torque-ripple components from the three coils effectively cancel (the components may add to a constant torque) at $4\omega$ and $8\omega$, so only a torque ripple at $6\omega$ is present. In a similar manner, torque ripple at $12\omega$ and $18\omega$ may be generated from pairs of the non-cancelling coil-current harmonics at $11\omega$ and $13\omega$, and $17\omega$ and $19\omega$, respectively, although the torque ripple at $12\omega$ and $18\omega$ may be less significant, or even negligible, as compared to the torque ripple at 6ω. In many cases, the torque ripple caused by non-cancelling harmonics is negligible. For example, in a disk drive, this torque ripple may have little or not detrimental affect on the data-read channel, and may not generate a perceivable noise.

But at least at a motor's cogging frequency (and possibly at harmonics of the cogging frequency), the resulting torque ripple caused by one of more of the non-cancelling harmonics may be substantial. For example, as discussed above, the cogging frequency of a three-phase, four-pole-pair, twelve-slot motor, such as the motor 10, is twenty four times the rotational frequency of the motor. Because the frequency ω of the coil currents and the BEMF voltages is four times the rotational frequency of the motor, the cogging frequency ideally equals 6ω, and may substantially equal 6ω even in cases where the motor 10 is not ideal, for example, where the motor has unequal spacing between the slots 16 or the poles 18, or has a rotor 14 that is out of round. As discussed above, the non-cancelling harmonics may generate a torque ripple at 6ω and at its first and second harmonics 12ω and 18ω. Therefore, it is theorized that the coil-current- or BEMF-induced torque ripple at 6ω may "excite" the motor 10 at its cogging frequency such that the combination of the induced torque ripple and the cogging torque results in a total 6ω torque ripple that may detrimentally affect the data recovery ability of a data-read channel of a disk drive, or that may generate a perceptible noise or "whine" at an unacceptable volume level. Similarly, it is theorized that at least in some applications, the total torque ripple at 12ω and 18ω may also detrimentally affect the data recovery ability of a data-read channel of a disk drive, and may generate a perceptible noise or "whine" at an unacceptable volume level.

Furthermore, the cogging torque alone (i.e., without being excited by the non-cancelling harmonics of the coil current or the BEMF voltages) may induce a torque ripple at a motor's cogging frequency, or the coil currents or the BEMF voltages alone (i.e., without exciting the cogging torque) induce torque ripple at a motor's cogging frequency or at any other frequency.

Consequently, as discussed below in conjunction with FIGS. 2-6, in an embodiment a motor controller generates a conditioning signal that induces in the motor a compensating torque ripple having substantially the same amplitude and substantially the opposite phase to the existing torque ripple, such that the resulting torque ripple is substantially zero.

Still referring to FIG. 1, the analyses of coil-current and BEMF harmonics, induced torque ripple, and cogging torque for motors having fewer or more than three electrical phases, four pole pairs, and twelve stator slots may be derived from the above analysis in a conventional manner.

Figure 2:
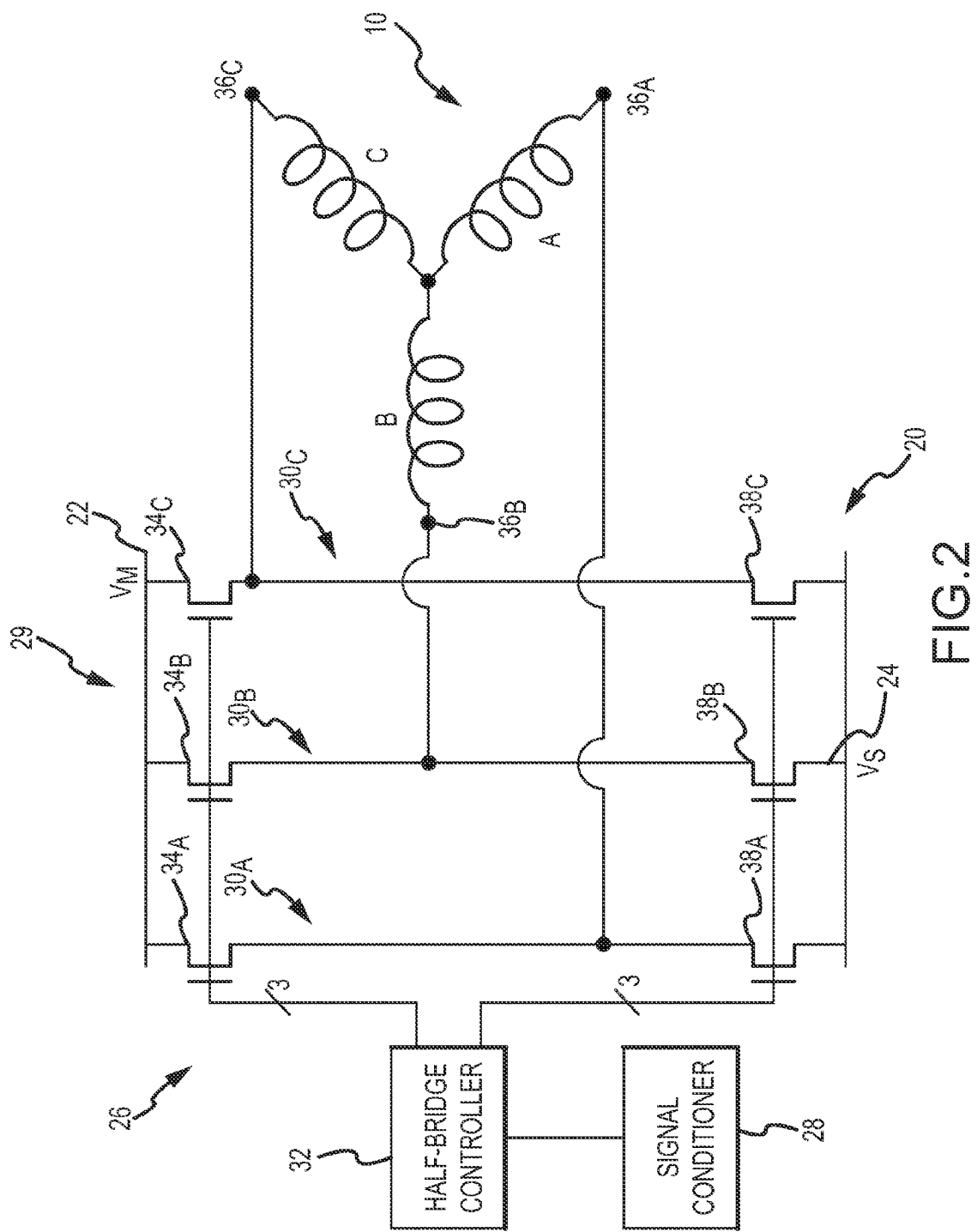
FIG. 2 is a diagram of the coils of an embodiment of a motor and of an embodiment of a motor controller.

FIG. 2 is a diagram of the motor 10 of FIG. 1 and of an embodiment of a motor controller 20, which is configured to alter at least one coil-signal harmonic. For example, the motor controller 20 may alter the amplitude or phase of a coil-current harmonic to reduce the amplitude of a torque ripple caused by the harmonic. Although the motor controller 20 is discussed in conjunction with altering one or more coil-current harmonics that excite the cogging frequency of the motor 10 to reduce a magnitude of a vibration at the cogging frequency, it is understood that the motor controller may be, or may be made to be, configured to alter other coil-signal harmonics to achieve other results.

The motor 10 may be electrically modelled by three coils A, B, and C, which the motor controller 20 drives with respective substantially sinusoidal currents that are phase shifted by 120° relative to each other as discussed above.

The motor controller 20 includes $V_M$ and $V_S$ supply nodes 22 and 24, a motor driver 26, and a signal conditioner 28. The supply voltage $V_M$ may be a positive voltage and the supply voltage $V_S$ may be a negative voltage or ground. Furthermore, the entire motor controller 20 may be disposed on a single integrated circuit (IC) die, or only a portion of the motor controller may be disposed on any single die.

The motor driver 26 includes a power stage 29 having half bridges $30_A$-$30_C$, and includes a half-bridge controller 32 for driving the half bridges. The half bridge $30_A$ includes a high-side NMOS transistor $34_A$ coupled between the $V_M$ supply node 22 and a motor-coil node $36_A$, and includes a low-side NMOS transistor $38_A$ coupled between the motor-coil node $36_A$ and the $V_S$ supply node 24. In operation, the half-bridge controller 32 drives the gates of the transistors $34_A$ and $38_A$ such that these transistors apply to the motor-coil node $36_A$ PWM voltage pulses that cause a substantially sinusoidal current having a fundamental frequency ω to flow through the coil A. But as discussed above, the PWM voltage pulses may also cause the coil current to have one or more signal components at a respective one or more harmonics of ω, or the BEMF voltage across the coil A may include one or more signal components at a respective one or more harmonics of ω. The half-bridges $30_B$-$30_C$ have a similar topology and operate in a similar manner to cause respective coil currents to flow through the coils B and C. The half-bridges $30_A$-$30_C$ may be disposed on an IC die with the half-bridge controller 32 and the signal generator 28, or the transistors 34 and 38 of the half-bridges 30 may be disposed externally to an IC die on which the half-bridge controller and the signal generator are disposed. Furthermore, embodiments of the half-bridge controller 32 are discussed below in conjunction with FIGS. 3-5.

The signal conditioner 28 may cause the half-bridge controller 32 to alter one or more harmonic components of the coil currents. For example, the signal conditioner 28 may generate a conditioning signal that reduces the magnitude of a torque ripple caused by the one or more harmonic components of the coil currents or BEMF voltages by altering, e.g., a phase or a magnitude of one or more of these harmonic components of the coil currents. Embodiments of the signal conditioner 28 are discussed below in conjunction with FIGS. 3-5.

Still referring to FIG. 2, alternate embodiments of the motor controller 20 are contemplated. For example, the supply voltage $V_M$ may be negative and the supply voltage $V_S$ may be positive or ground. Furthermore, one or more of the NMOS transistors 34 and 36 may be replaced with other types of transistors or switching devices. In addition, the motor controller 20 may be designed to drive a motor having more or fewer than three phases. Moreover, the motor 10 may be other than a brushless DC motor.

Figure 3:
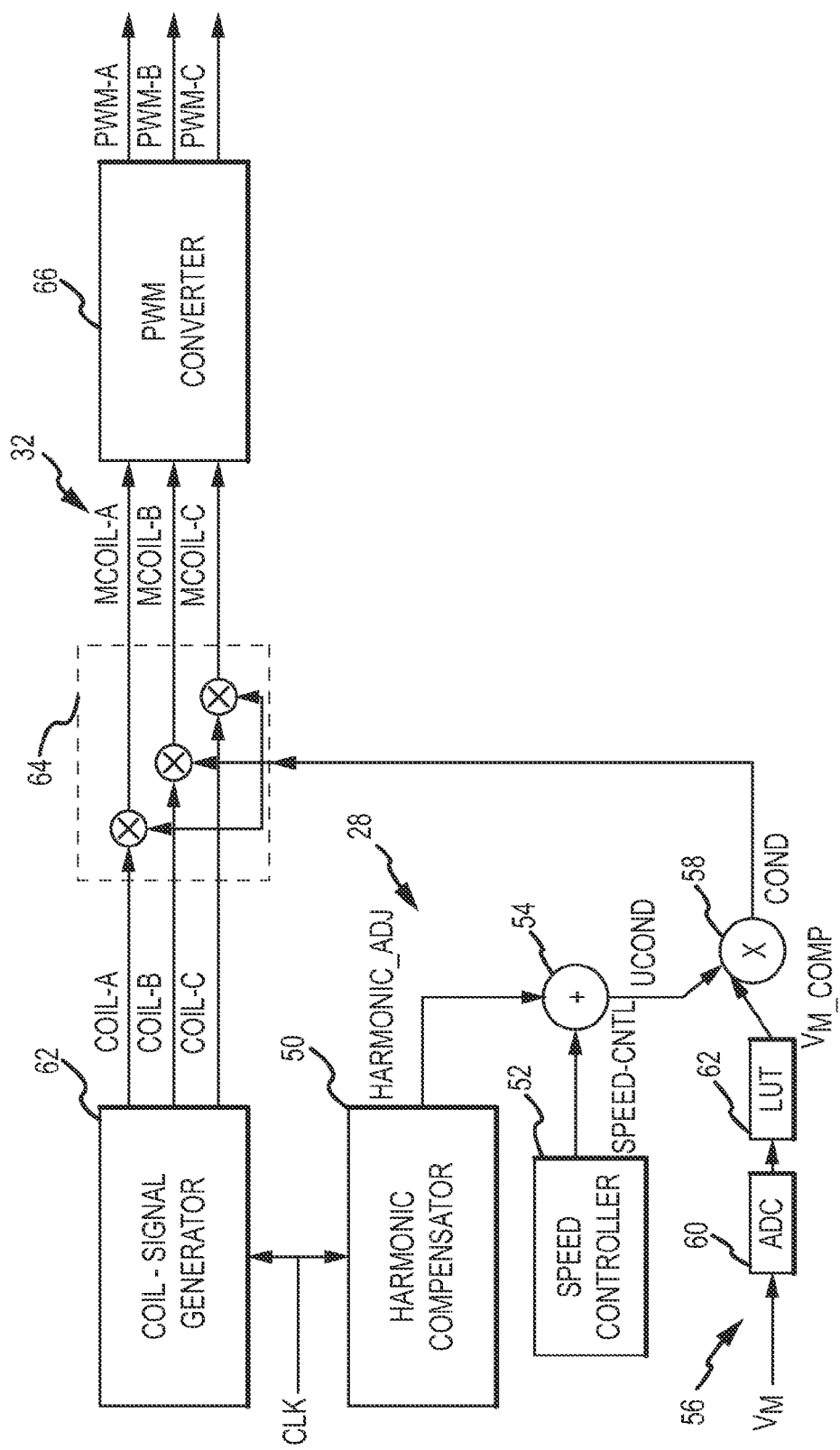
FIG. 3 is a diagram of an embodiment of the motor driver and an embodiment of the signal conditioner of the motor controller of FIG. 2.

FIG. 3 is a diagram of an embodiment of the signal conditioner 28 and of an embodiment of the half-bridge controller 32 of FIG. 2, where like numbers refer to like components common to FIGS. 1-3.

The signal conditioner 28 includes a harmonic compensator 50, a speed controller 52, a combiner (for example, a summer) 54, an optional supply-voltage compensator 56, and an optional multiplier 58.

The harmonic compensator 50 generates a harmonic-adjustment signal HARMONIC_ADJ which may alter at least one harmonic component nω of the currents flowing through the motor coils A, B, and C of the motor 10 (FIG. 2), e.g., to reduce the magnitude of a noise caused by torque ripple. The signal HARMONIC_ADJ may be at the same frequency as the at least one harmonic of the coil currents that is to be altered, or it may be at another frequency as discussed below.

The harmonic compensator 50 is clocked with a signal CLK, which has a frequency proportional to the speed of the motor 10, and may generate the signal HARMONIC_ADJ in analog or digital form. For example, the harmonic compensator 50 may include a memory that stores samples of a profile of HARMONIC_ADJ. Furthermore, the motor controller 20 may synchronize HARMONIC_ADJ to the position of the rotor 14 in a conventional motor.

The speed controller 52 generates a constant signal SPEED-CNTL that sets the steady-state speed of the motor 10. For example, in a disk drive, SPEED-CNTL may have a level that sets the motor speed to 7200 RPM. The speed controller 52 may generate SPEED-CNTL in analog or digital form. Alternatively, the speed controller 52 may be omitted, and the signal conditioner 28 may receive the signal SPEED-CNTL from an external source.

The summer 54 combines the signals HARMONIC_ADJ and SPEED-CNTL into an uncompensated conditioning signal UCOND.

The optional supply voltage compensator 56, when present, effectively adjusts the value of the speed-control signal SPEED-CNTL to compensate for a change in the power-supply voltage $V_M$ which powers the motor 10 (FIG. 2). As discussed above, the power stage 29 (FIG. 2) drives the coils of the motor 10 with respective PWM voltage pulses each having an amplitude substantially equal to $V_M$ minus the relatively small voltage drops across the high-side transistors 34. Therefore, the speed at which the rotor 14 of the motor 10 rotates is proportional to $V_M$. If $V_M$ does not equal the voltage level for which the value of the signal SPEED-CNTL is set, then the rotor 14 may rotate at an improper speed. But the compensator 56 may effectively adjust the value of SPEED-CNTL so that the rotor 14 rotates at the proper speed. For example, the supply voltage compensator 56 may include an analog-to-digital converter (ADC) 60, which converts the value of $V_M$ into a digital signal. A look-up-table LUT 62 receives this digital signal from the ADC 60, and, in response, provides a compensation signal $V_{M\_COMP}$ to the multiplier 58, which multiplies the uncompensated conditioning signal UCOND by $V_{M\_COMP}$ to generate a compensated conditioning signal COND that causes the rotor 14 to rotate at the proper speed. In the absence of the supply voltage compensator 56, the summer 54 generates the conditioning signal COND directly.

The half-bridge controller 32 includes a coil-signal generator 62, a multiplier 64, and a PWM converter 66.

The coil-signal generator 62 generates, in analog or digital form, coil signals COIL-A, COIL-B, and COIL-C, which represent the driving voltages that cause respective specified currents to flow through the motor coils A, B, and C (FIG. 2). For example, to cause substantially sinusoidal currents having respective phase angles of 0°, +120°, and −120° to flow through the motor coils A, B, and C, the generator 62 may generate the coil signals having sinusoidal profiles, or having suitable non-sinusoidal profiles, and being phase shifted by 120° relative to one another. An example of a suitable non-sinusoidal coil-signal profile for causing sinusoidal coil currents is disclosed in U.S. Pat. No. 6,137,253, which is incorporated by reference. The coil-signal generator 62 is clocked by the same signal CLK as the harmonic generator 50, and the motor controller 20 may synchronize the coil signals with the position of the rotor 14 (FIG. 2) in a conventional manner. If the coil-signal generator 62 generates the coil signals in digital form, then the coil-signal generator may be a memory that stores three copies of the coil signal shifted relative to one another by 120°, or that stores a single copy of the coil signal and includes conventional circuitry for generating from this single copy the three coil signals shifted by 120° relative to one another.

The multiplier 64 multiplies each of the coil signals COIL-A, COIL-B, and COIL-C from the coil-signal generator 62 by the conditioning signal COND to generate three respective modulated coil signals MCOIL-A, MCOIL-B, and MCOIL-C.

And the PWM converter 66 converts the modulated coil signals MCOIL-A, MCOIL-B, and MCOIL-C into respective PWM analog voltage signals PWM-A, PWM-B, and PWM-C for respectively driving the high-side transistors $34_A$-$34_C$ of FIG. 2. The PWM converter 66 may also generate signals for driving the low-side transistors $38_A$-$38_C$ of FIG. 2. For example, the signals for driving the low-side transistors $38_A$-$38_C$ may be the respective inverses of the signals PWM-A, PWM-B, and PWM-B.

Figure 4:
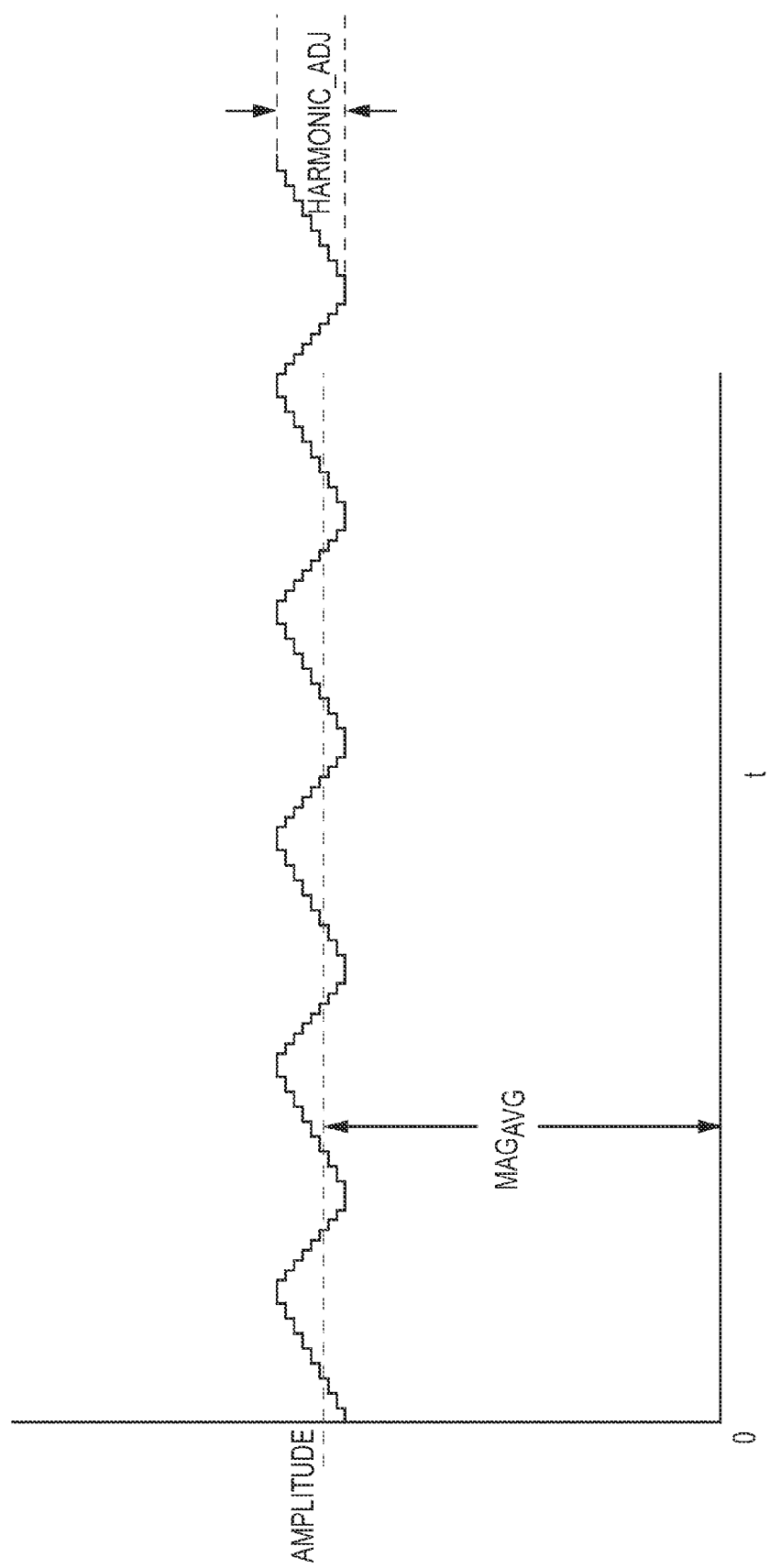
FIG. 4 is a plot of a conditioning signal generated by an embodiment of the signal conditioner of FIG. 2.

FIG. 4 is a plot of an embodiment of the signal COND of FIG. 3. The signal COND has an average (DC) magnitude $MAG_{AVG}$ that is amplitude modulated by a signal-ripple component that is the signal HARMONIC_ADJ. In this embodiment, HARMONIC_ADJ is a digital representation of the sixth harmonic of w, which is the fundamental frequency of the signals COIL-A, COIL-B, and COIL-C, of the currents flowing through the motor coils A, B, and C, and of the BEMF voltages across the motor coils A, B, and C. As discussed below, this embodiment of the signal COND may alter the fifth and seventh harmonic components 5ω and 7ω of the currents flowing through the motor coils, and, therefore, may alter motor vibrations at the sixth harmonic of w.

Referring to FIGS. 2-4, the operation of an embodiment of the signal conditioner 28 and of an embodiment of the half-bridge controller 32 is discussed for altering a motor vibration at 6ω under the following conditions: the coil signals COIL-A, COIL-B, and COIL-C are digital signals at frequency w; the signal HARMONIC_ADJ is a digital signal at frequency 6ω; the motor controller 20 operates the motor 10 at a steady-state speed of 7200 RPM (120 Hz) and the motor has a fundamental cogging frequency at 6ω (2880 Hz); and the desired result is to reduce the magnitude of the motor vibration at the cogging frequency so as to reduce the level of audible noise generated by the motor at the cogging frequency.

The coil-signal generator 62 generates COIL-A, COIL-B, and COIL-C each at a fundamental frequency ω and each phase shifted 120° relative to one another. But because COIL-A, COIL-B, and COIL-C are digital signals, they also include non-cancelling harmonic components at least at 5ω and 7ω. As discussed above in conjunction with FIG. 1, when modulated by the coil BEMF, which is has a fundamental frequency ω, these harmonic components may excite the motor 10 at its cogging frequency of 6ω, and thus may cause the motor to vibrate and generate an audible noise at 6ω. In addition, as discussed above in conjunction with FIG. 1, the coil BEMF voltages may also include non-cancelling harmonic components at least at 5ω and 7ω, and when modulated by the coil currents, which have a fundamental frequency w, these BEMF harmonic components may also excite the motor 10 at its cogging frequency of 6ω, and thus may also cause the motor to vibrate and generate an audible noise at 6ω.

To reduce the magnitude of the motor torque at 6ω, the harmonic compensator 50 generates as the signal HARMONIC_ADJ a digital sinusoid (FIG. 4) having a frequency 6ω and having a phase and an amplitude that reduce the volume of the audible noise that would otherwise be generated by the motor 10 at 6ω to a level that is below a specified threshold. For example, an operator may manually adjust the amplitude or phase of HARMONIC_ADJ in a conventional manner until a sound meter shows that the noise at 6ω is below a specified threshold. Further to this example, the signal conditioner 28 may allow one to adjust the magnitude and phase of HARMONIC-ADJ to respective precisions having the same or having different numbers of bits. In an alternative embodiment, the motor controller 12 may include an on-board sound meter and may, from time to time, adjust the amplitude or phase of HARMONIC_ADJ to set and maintain the volume of the motor noise at 6ω below a specified threshold.

The speed controller 52 generates the signal SPEED-CNTL as a constant digital signal, and the multiplier 54 multiplies HARMONIC_ADJ by SPEED-CNTL to generate UCOND.

The supply-voltage compensator 56 generates the signal $V_{M\_COMP}$ as a constant digital signal, and the multiplier 58 multiplies UCOND by $V_{M\_COMP}$ to generate the signal COND of FIG. 4. The signal COND includes the DC component $MAG_{AVG}$, which is substantially equal to SPEED-CNTL+$V_{M\_COMP}$, and includes an AC ripple component centred about $MAG_{AVG}$ and having an amplitude substantially equal to the amplitude of the signal HARMONIC_ADJ.

The multiplier 64 effectively modulates each of the signals COIL-A, COIL-B, and COIL-C with the signal COND to respectively generate signals MCOIL-A, MCOIL-B, and MCOIL-C. This modulation causes the 6ω component of COND and the ω components of COIL-A, COIL-B, and COIL-C to impart difference (6ω−ω) and sum (6ω+ω) harmonic components at 5ω and 7ω to MCOIL-A, MCOIL-B, and MCOIL-C for reasons discussed above in conjunction with FIG. 1. Because these imparted harmonic components are summed with the existing 5ω and 7ω harmonic components of the signals COIL-A, COIL-B, and COIL-C, the imparted harmonic components effectively alter the phases or amplitudes of the existing harmonic components such that the signals MCOIL-A, MCOIL-B, and MCOIL-C have resulting 5ω and 7ω harmonic components that have different phases or amplitudes relative to the 5ω and 7ω harmonic components of COIL-A, COIL-B, and COIL-C. As discussed below, the adjusted phases and amplitudes of the 5ω and 7ω harmonic components of MCOIL-A, MCOIL-B, and MCOIL-C result in a 6ω motor vibration having a smaller magnitude than it otherwise would in the absence of the signal HARMONIC-ADJ.

The PWM converter 66 converts the signals MCOIL-A, MCOIL-B, and MCOIL-C into the signals PWM-A, PWM-B, and PWM-C, respectively.

For reasons that are discussed above in conjunction with FIG. 1, the altered 5ω and 7ω harmonic components of PWM-A, PWM-B, and PWM-C give rise to the altered 5ω and 7ω harmonic components of the currents flowing through the motor coils A, B, and C. When these altered harmonic components are modulated by the BEMF of the motor coils, the result is an altered torque component at the cogging frequency 6ω (5ω+ω=7ω−ω=6ω) of the motor 10. As discussed above, the magnitude of this altered torque component is such that the resulting audible noise at 6ω has a volume that is reduced to an acceptable level that is below a specified threshold.

Furthermore, because HARMONIC-ADJ is a digital signal, it may also include harmonic components at 12ω and 18ω, which may alter the magnitudes of the vibrations of the motor 10 at 12ω (the second harmonic of the motor 10 cogging frequency) and at 18ω (the third harmonic of the motor cogging frequency). Therefore, the phase or amplitude of the signal HARMONIC_ADJ may be altered so that the magnitude of one or both of these harmonic noise components may be reduced to below a specified threshold. Alternately, the signal HARMONIC_ADJ may include separate AC components at 12ω and 18ω to reduce the volume of the motor noise at these frequencies.

Referring again to FIG. 3, alternate embodiments of the signal conditioner 28 and the half-bridge 32 are contemplated. For example, one or more of the alternate embodiments discussed above in conjunction with FIG. 2 may apply to the signal conditioner 28 and the half bridge 32 of FIG. 3. Furthermore, although described as voltage signals, any one or more of the following signals may be current signals: HARMONIC_ADJ, SPEED-CNTL, $V_{M\_}$COMP, UCOND, COND, COIL-A, COIL-B, COIL-C, MCOIL-A, MCOIL-B, MCOIL-C, PWM-A, PWM-B, and PWM-C. And any of these signals may be an analog or a digital signal. Furthermore, the signal HARMONIC_ADJ may include one or more additional AC components at frequencies other than 6ω to alter one or more additional harmonic components of the coil currents. And a function of the signal HARMONIC_ADJ may be other than reducing the volume of motor noise.

Figure 5:
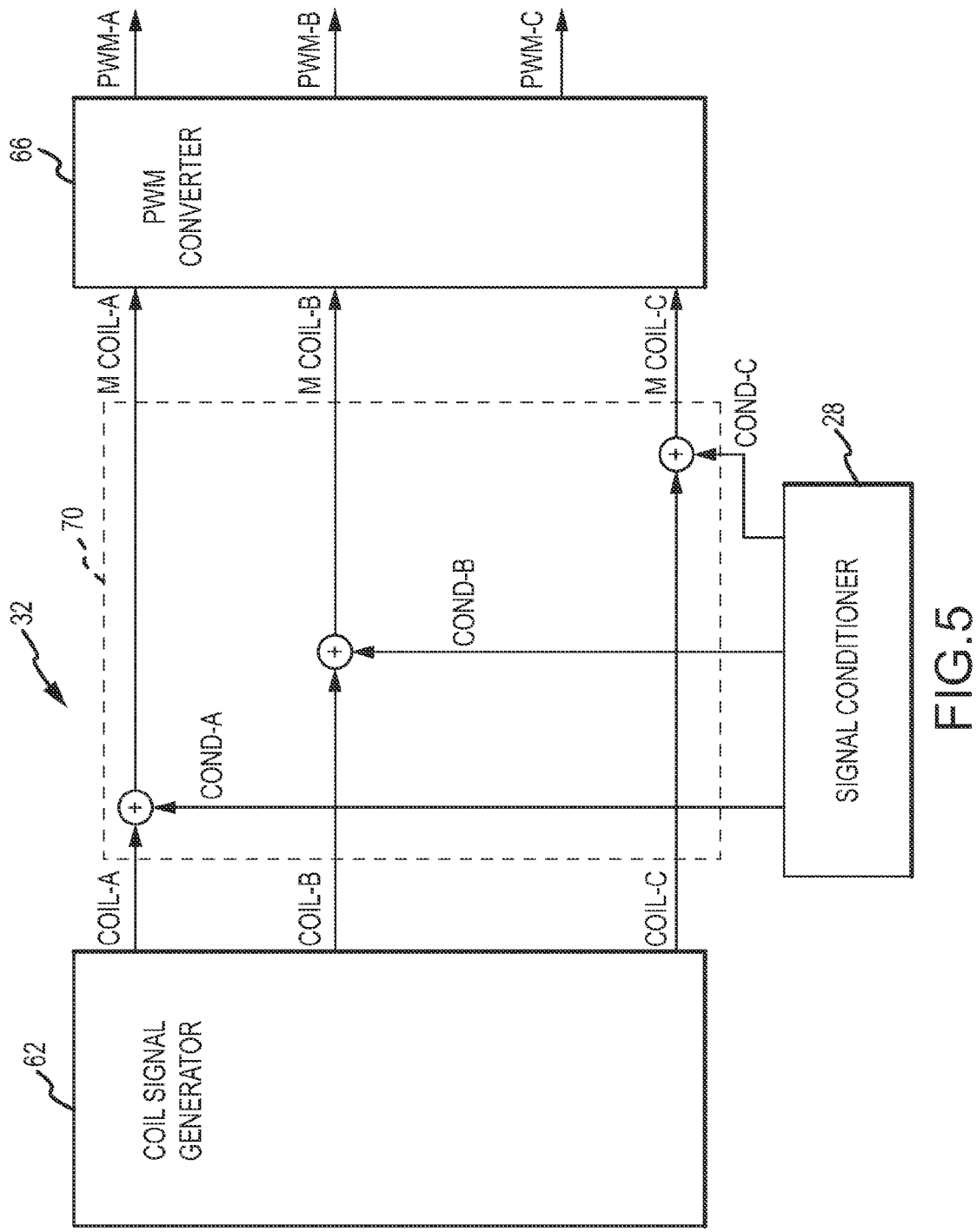
FIG. 5 is a diagram of another embodiment the motor driver and another embodiment of the signal conditioner of the motor controller of FIG. 2.

FIG. 5 is a diagram of another embodiment of the signal conditioner 28 and of another embodiment of the half-bridge 32 of FIG. 2, where like numbers refer to components common to FIGS. 1-5.

The signal conditioner 28 may be similar to the signal conditioner 28 of FIG. 3, except that instead of providing one signal COND to the half-bridge controller 32, it may provide three signals COND-A, COND-B, and COND-C that are designed to be added to the signals COIL-A, COIL-B, and COIL-C, respectively.

The half-bridge 32 of FIG. 5 may be similar to the half-bridge 32 of FIG. 3, except that the multiplier 64 of FIG. 3 is replaced with an adder 70 in FIG. 5.

In operation, because the adder 70 does not modulate the coil signals COIL-A, COIL-B, and COIL-C like the multiplier 64, the signals COND-A, COND-B, and COND-C include harmonic components that are the same as those to be altered in the coil signals. So, for example, to reduce the magnitude of a motor vibration at 6ω, the signals COND-A, COND-B, and COND-B may include harmonic components at 5ω and 7ω instead of at 6ω like the signal COND of FIG. 4.

Referring again to FIG. 5, alternate embodiments of the signal conditioner 28 and the half-bridge 32 are contemplated. For example, one or more of the alternate embodiments discussed above in conjunction with FIGS. 2-3 may apply to the signal conditioner 28 and to the half bridge 32 of FIG. 5. Furthermore, where the coil-signal generator 62 stores profiles of the coil signals COIL-A, COIL-B, and COIL-C, the signal conditioner 28 and the adder 70 may be omitted, and the stored profiles of the coil signals may be altered so as to alter one or more harmonics of the coil currents as desired.

Figure 6:
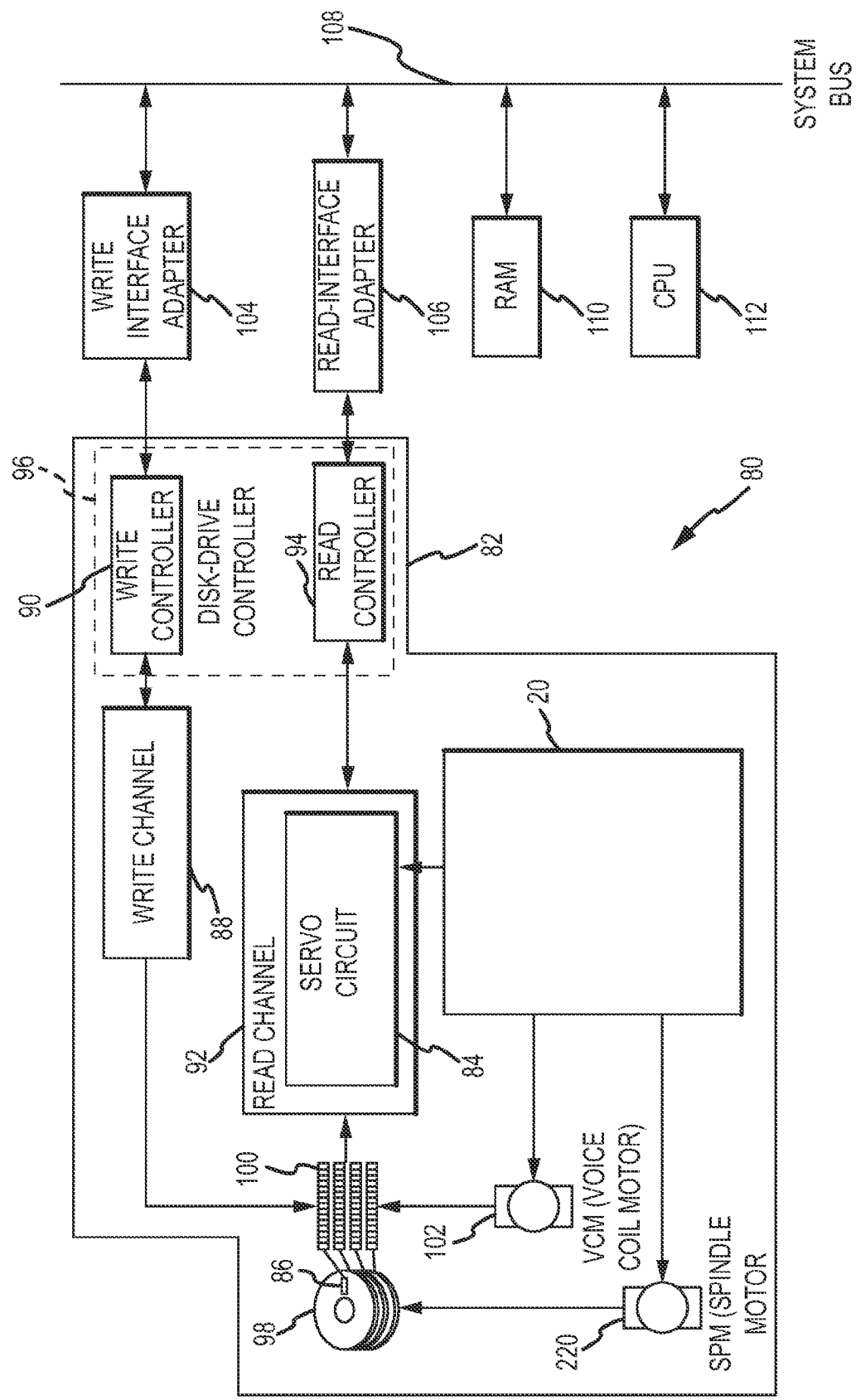
FIG. 6 is a diagram of a disk-drive system that includes at least one of the embodiments of the motor and at least one of the embodiments of the motor controller of FIGS. 2-3 and 5.

FIG. 6 is a block diagram of a disk-drive system 80, which may incorporate the motor 10 and at least one of the embodiments of the motor controller 20 of FIGS. 2-5, where like numbers reference components common to FIGS. 2-6. The disk-drive system 80 includes a disk drive 82, which includes a servo circuit 84. The disk drive 82 includes a read-write head 86, a write channel 88 for generating and driving the head 86 with a write signal, and a write controller 90 for interfacing the write data to the write channel 88. The disk drive 82 also includes a read channel 92 for receiving servo and application-data read signals from the head 86 and for recovering data from these read signals, and includes a read controller 94 for organizing the read data. Together, the write and read controllers 90 and 94 compose a disk-drive controller 96. The read channel 92 includes the servo circuit 84, which receives the servo signal from the head 86, recovers the servo data from the servo signal, and provides the recovered servo data to the motor controller 20. The disk drive 82 further includes a storage medium such as one or more disks 98, each of which may contain data on one or both sides and which may be magnetic, optical, or another type of storage disk. The head 86 writes/reads the data stored on the disk 98, and is coupled to a movable support arm 100. The servo circuit 84 calculates a position-error signal, and, in response to the error signal, the motor controller 20 provides a control signal to the voice-coil motor (VCM) 102, which positionally maintains/radially moves the arm 100 so as to positionally maintain/radially move the head 86 over the desired data tracks on the disks 98. The spindle motor (SPM) 10 rotates the disks 98, and the motor controller 20 maintains them at the proper rotational speed.

The disk-drive system 80 also includes write and read interface adapters 104 and 106 for respectively interfacing the disk-drive controller 94 to a system bus 108, which may be specific to the system used. Typical system busses include ISA, PCI, S-Bus, Nu-Bus, etc. The system 80 typically has other devices, such as a random access memory (RAM) 110 and a central processing unit (CPU) 112 coupled to the bus 108.

The circuits of the system 80 may be disposed on a single or on multiple dies. Furthermore, the motor 10 and motor controller 20 may be incorporated into a system other than a disk drive.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. A motor controller, comprising:
    a motor driver configured to generate a motor-coil drive signal having a first component at a first frequency; and
    a signal conditioner coupled to the motor driver and configured to alter the first component;
wherein:
the signal conditioner is configured to generate a conditioning signal; and
the motor driver comprises:
    signal generator configured to generate an initial drive signal;
a multiplier configured to generate an intermediate drive signal by multiplying the initial drive signal with the conditioning signal; and
a converter configured to convert the intermediate drive signal into the motor-coil drive signal.

2. The motor controller of claim 1 wherein the signal conditioner is configured to alter an amplitude of the first component.

3. The motor controller of claim 1 wherein the signal conditioner is configured to alter a phase of the first component.

4. The motor controller of claim 1 wherein the signal conditioner is configured to alter a power of the first component.

5. The motor controller of claim 1 wherein the motor driver is further configured to generate the motor-coil drive signal having a fundamental frequency, the first frequency being an integer multiple of the fundamental frequency.

6. The motor controller of claim 1 wherein:
    the motor driver is configured to generate the motor-coil drive signal having a second component at a second frequency; and
    the signal conditioner is configured alter the second component.

7. The motor controller of claim 1 wherein:
    one of the first and second frequencies is substantially five times a fundamental frequency of the motor-coil drive signal; and
    the other of the first and second frequencies is substantially seven times the fundamental frequency of the motor-coil drive signal.

8. The motor controller of claim 1 wherein:
    the motor driver is configured to generate the motor-coil drive signal having a fundamental component at a fundamental frequency and having a second component at a second frequency, a difference between the first and second frequencies substantially equaling twice the fundamental frequency; and
    the signal conditioner is configured alter the second component.

9. The motor controller of claim 8 wherein:
    one of the first and second frequencies is substantially five times the fundamental frequency; and
    the other of the first and second frequencies is substantially seven times the fundamental frequency.

10. The motor controller of claim 1 wherein the first frequency is substantially five times a fundamental frequency of the motor-coil drive signal.

11. The motor controller of claim 1 wherein the first frequency is substantially seven times a fundamental frequency of the motor-coil drive signal.

12. A motor controller, comprising:
    a motor driver configured to generate a digital motor-coil drive signal having a first component at a first frequency; and
    a signal conditioner coupled to the motor driver and configured to digitally alter the first component at approximately the first frequency;
wherein:
    the signal conditioner is configured to generate a conditioning signal; and
    the motor driver comprises:
        signal generator configured to generate an initial drive signal;
        a combiner configured to generate an intermediate drive signal from the initial drive signal and the conditioning signal; and
        a converter configured to convert the intermediate drive signal into width-modulated pulses that form the motor-coil drive signal.

13. A motor controller, comprising:
    a motor driver configured to generate a digital motor-coil drive signal having a first component at a first frequency; and
    a signal conditioner coupled to the motor driver and configured to digitally alter the first component;
wherein:
the motor-coil drive signal has a fundamental component at a fundamental frequency; and
the signal conditioner comprises:
    a first signal generator configured to generate a substantially constant first component of a conditioning signal;
    a second signal generator configured to generate a second component of the conditioning signal having a second frequency, a difference between the first and second frequencies substantially equaling the fundamental frequency; and a combiner operable to generate the conditioning signal from the first and second components of the conditioning signal and to provide the conditioning signal to the motor driver.

14. The motor controller of claim 13 wherein:

the first frequency is substantially five times a fundamental frequency of the motor-coil drive signal; and the second frequency is substantially six times the fundamental frequency of the motor-coil drive signal.

15. The motor controller of claim 13 wherein:

the first frequency is substantially seven times a fundamental frequency of the motor-coil drive signal; and the second frequency is substantially six times the fundamental frequency of the motor-coil drive signal.

16. A system, comprising:

a motor having a coil; and a motor controller, comprising:
- a motor driver configured to generate a digital drive signal having a first component at a first frequency and to drive the motor coil with the digital drive signal; and a signal conditioner coupled to the motor driver and configured to digitally alter the first component;

wherein:

the motor has a cogging torque at a second frequency; and the motor controller is configured to generate the drive signal having a fundamental component at a fundamental frequency such that a difference between the first and second frequencies is substantially equal to the fundamental frequency.

17. A method, comprising:

driving a coil of a motor with a current;

determining a frequency component of the current at a first frequency; and conditioning the current at approximately the first frequency to maintain a magnitude of a vibration experienced by the motor below a threshold in response to the determining of the frequency component;

the method further comprising:

generating with the coil a back-electromotive-force voltage having a component at a second frequency;

wherein the vibration has a component at the first frequency; and wherein conditioning the current comprises causing the current to have a component at a third frequency such that a difference between the second and third frequencies substantially equals the first frequency.

18. The method of claim 17 wherein the vibration has a component substantially at a cogging frequency of the motor.

19. The method of claim 17 wherein:

the second frequency is a fundamental frequency of the back-electromotive-force voltage;

the first frequency is a substantially six times the fundamental frequency; and the third frequency is substantially seven times the fundamental frequency.

20. The method of claim 17 wherein:

the second frequency is a fundamental frequency of the back-electromotive-force voltage;

the second frequency is a substantially six times the fundamental frequency; and the third frequency is substantially five times the fundamental frequency.

21. The method of claim 17 wherein the vibration has a component having an audible frequency.

22. A method, comprising:

driving a coil of a motor with a current;

determining a frequency component of the current at a first frequency; and conditioning the current at approximately the first frequency to maintain a magnitude of a vibration experienced by the motor below a threshold in response to the determining of the frequency component;

the method further comprising:

generating with the coil a back-electromotive-force voltage having a component at a second frequency;

wherein the vibration has a component at the first frequency; and wherein conditioning the current comprises causing the current to have a component at a third frequency such that a sum of the second and third frequencies substantially equals the first frequency.

* * * * *